April 3, 1951     P. H. ZENTNER     2,547,192
RIGHT AND LEFT TURN SIGNAL FOR AUTOMOBILES
Filed Oct. 22, 1949
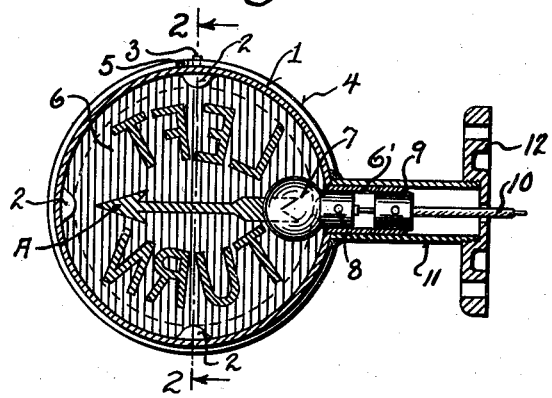
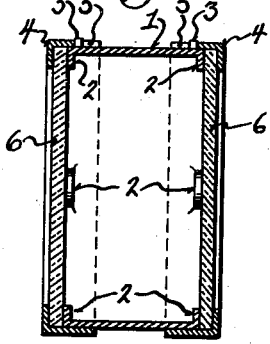 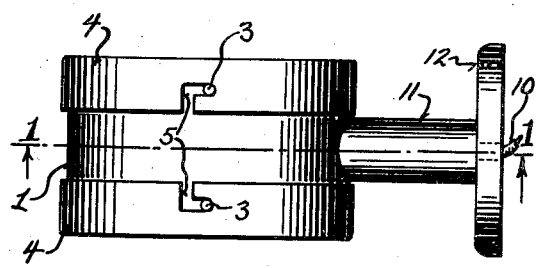
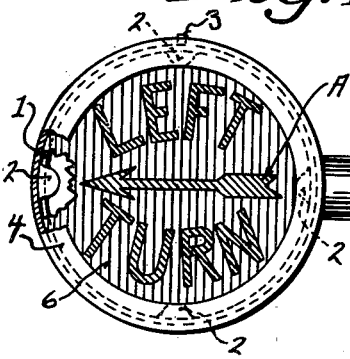 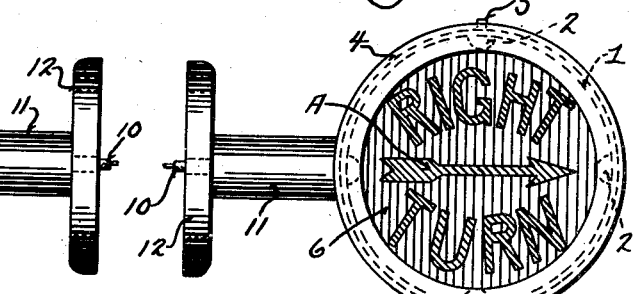
INVENTOR
PAUL H. ZENTNER
BY
ATTORNEYS

UNITED STATES PATENT OFFICE 2,547,192

RIGHT AND LEFT TURN SIGNAL FOR AUTOMOBILES

Paul H. Zentner, Milwaukee, Wis.

Application October 22, 1949, Serial No. 123,030

1 Claim. (Cl. 177—329)

My invention refers to safety signal lights of the right and left turn variety.

The object of my invention is to provide a simple effective and economically fabricated right and left turn signal for automobiles, the same being an improvement upon my expired Patent Number 1,716,285.

The specific object of my present invention is to provide a cheap one-piece sleeve that extends from the rim of a cylindrical casing, whereby the sleeve is threaded at its end for the reception of an apertured pad, wherein the sleeve may vary in length to meet special equipment conditions of an automobile.

A further object of my invention is to provide the cylindrical casing with spaced lips and associated lens retaining ring caps, whereby an inexpensive lock and release means comprising heads may be attached to the casing.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings:

Figure 1 represents a face view of a right and left signal unit, embodying the features of my invention, the same being in section as indicated by line 1, 1 of Figure 3.

Figure 2 is a cross section of the same, the section being indicated by line 2, 2 of Figure 1.

Figure 3 is a top plan view of the signal units.

Figure 4 is a face view of the same, the parts broken away to illustrate structural features, the unit being provided with a lens showing left turn; and Figure 5 is a similar view of a unit showing a lens carrying the words right turn, it being understood that a pair of these signal lights are attached to an automobile body.

Referring by characters to the drawings, 1 indicates a cylindrical casing, having open ends and intermediate space lips 2 at its edges.

The peripheral face of the casing, adjacent its edges, is provided with upwardly extended locking pins 3.

As best shown in Figures 2 and 3 of the drawings, I provide right angle flanged rings 4, which rings are formed with bayonet slots 5 for interlocking engagement with the pins 3.

Hence, to assemble the signal unit, a pair of lenses 6, 6 are fitted into the angle flanged rings, the said lenses being preferably formed with a red background and carrying the words left turn or right turn in green color, the said words being horizontally interrupted by green horizontal arrows A as indicated in Figures 4 and 5.

The rim of the cylindrical casing has projecting therefrom a short sleeve 6′ into which is fitted an electric lamp bulb 7, having a shank 8 nested in the sleeve together with an associate socket member 9, as shown in Figure 1 of the drawings, the socket member having extended therefrom an electric conductor 10.

Secured to the rim of the casing and fitted over the sleeve 6′ is a tubular shank 11, the open end of said shank being provided with threads, and the tubular shank may be of a length approximately flush with the socket 9 or longer depending upon the type of signal unit that is desired for attachment and exposure at the right and left sides of a car body.

To complete the assemblage, I provide a circular apertured pad 12, which pad is in threaded union with the end of the tubular shank 11, as shown.

From the foregoing description, it is apparent in order to assemble the ring caps with their associated lenses, said lenses are first fitted into the rings and thereafter the outer flanges of said rings are slipped over the open ends of the casing, and in so doing, the locking pins 3 are engaged by the bayonet slots 5, and thereafter said rings are given a slight twist for completing the locking connection between them and the casing, it being understood that the inner faces of the lenses 6 are in abutting engagement with the casing lips 2.

I claim:

A right and left signal unit for automobiles, comprising a cylindrical casing, having open ends provided with peripheral pins and inturned lips, a tubular shank extending from the rim of the casing, having a threaded end for the reception of the shank and socket of an electric lamp, a threaded end apertured base pad fitted to the threaded end of the sleeve and flanged rings having lenses fitted therein engageable with the casing lips, the peripheral flange of said rings being provided with bayonet slots engageable with the cylindrical casing pins, said lenses being provided respectively with right and left hand signal indicia.

PAUL H. ZENTNER.

REFERENCES CITED

The following references are of record in the file of this patent:

UNITED STATES PATENTS

| Number | Name | Date |
| --- | --- | --- |
| 1,498,088 | Frascadore et al. | June 17, 1924 |
| 1,534,222 | Lackstrom | Apr. 21, 1925 |
| 1,761,285 | Zentner | June 3, 1930 |
| 1,796,694 | Silva | Mar. 17, 1931 |